United States Patent [19]

Hopkins et al.

[11] 4,275,476
[45] Jun. 30, 1981

[54] ICE SCRAPER

[75] Inventors: Evan L. Hopkins, Emporia; Robert R. Thomas, Hartford, both of Kans.

[73] Assignee: Hopkins Manufacturing Corporation, Emporia, Kans.

[21] Appl. No.: 76,822

[22] Filed: Sep. 19, 1979

[51] Int. Cl.³ .......................... B60S 1/04; A47L 1/06
[52] U.S. Cl. ..................................... 15/236 R; 30/169
[58] Field of Search ............... 15/236 R, 235.6, 210.5; 30/164.8, 169, 172

[56] References Cited

U.S. PATENT DOCUMENTS

| | | | |
|---|---|---|---|
| 1,377,484 | 5/1921 | Huneryager | 30/172 |
| 2,719,316 | 10/1955 | Hauser | 15/236 R |
| 4,121,316 | 10/1978 | Perry | 15/236 R |
| 4,164,801 | 8/1979 | Thomas | 15/236 R |

Primary Examiner—Edward L. Roberts
Attorney, Agent, or Firm—Kenway & Jenney

[57] ABSTRACT

A molded ice scraper one piece body has independently flexible finger portions terminating in aligned scraping edges that are joined by webs a few thousandths of an inch thick. A continuous, but breakable, blade is thereby formed that will clean a streak-free swath on a windshield or similar surface. The slots separating the fingers are curved where they meet the scraper intermediate section, to eliminate stress concentration. The fingers have forward facing ice deflecting surfaces at an obtuse angle to the surface to be cleaned, extending from the scraper edge, and front facing ice chipping surfaces extending vertically upwardly from an intersection with the ice deflecting surfaces that is spaced back from the scraper edge.

10 Claims, 5 Drawing Figures

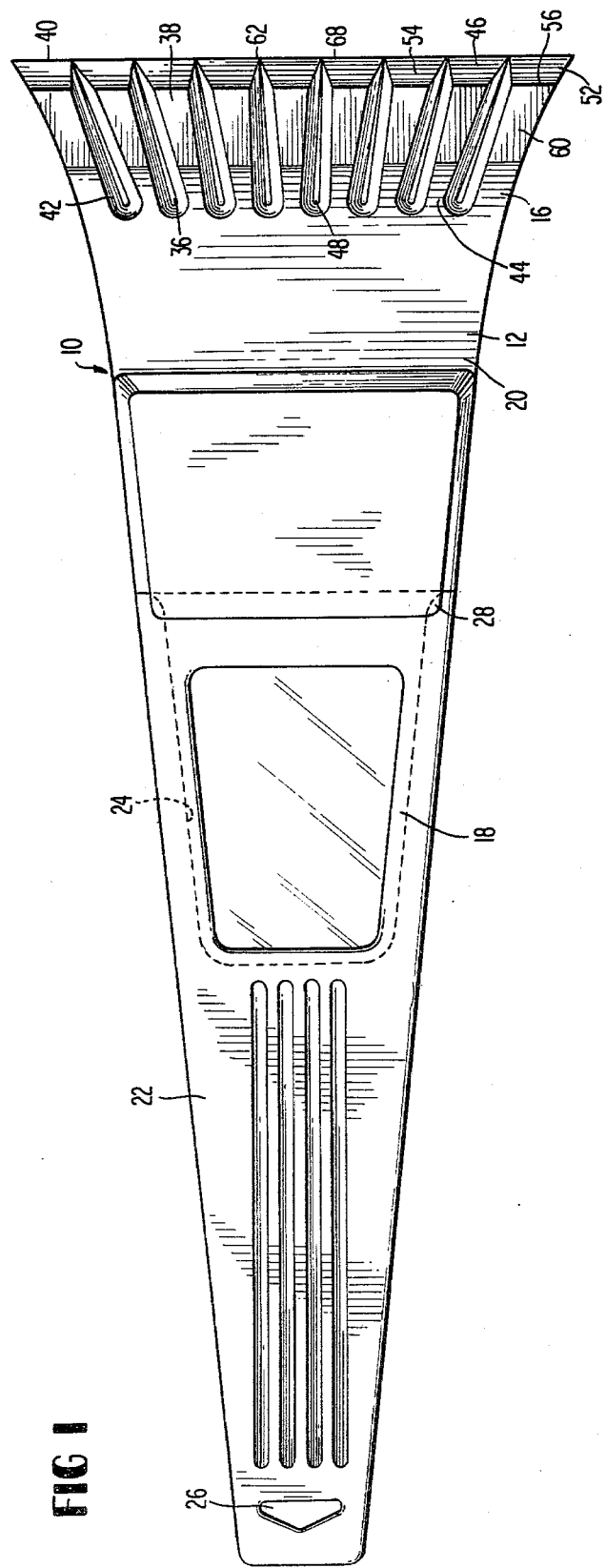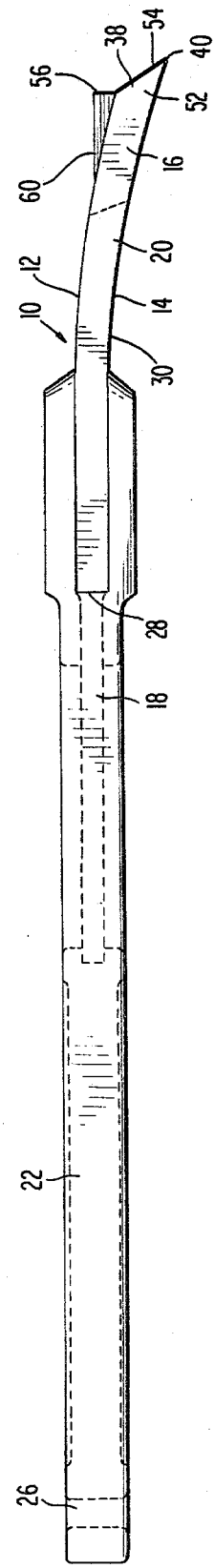

ICE SCRAPER

BACKGROUND

This invention relates generally to ice scrapers and particularly to hand held ice scrapers for clearing windshields and the like.

Scrapers for removing ice from automobile windshields and windows have recently been developed in convenient and efficient forms. An early widely available form of the scraper was made of a flat integral piece of polymeric material such as polymethacrylate. A pliable polymeric sheath over one end of the piece served as a hand grip. From the hand grip, the piece increased in width to a blade end that had an oblique front surface with a bottom ice scraping edge.

An improved ice scraper was disclosed in U.S. Pat. No. 4,040,140 to E. L. Hopkins et al. It showed a one-piece body with a blade at one end, a tapered handle at the other end, and an intermediate section between the blade and the handle. The intermediate section was curved downwardly so that the blade was disposed below the handle. This enabled the user to exert optimal scraping force in a direction parallel to the surface to be scraped and minimized ice accumulation on the hand of the user.

A scraper with independently flexing fingers was disclosed in U.S. Pat. No. 4,164,801 to R. R. Thomas. The scraper has a blade region comprising resilient, independently flexible, scraping fingers that each have a forward facing chisel edge. Each chisel edge has an ice deflecting surface inclined at an obtuse angle to the surface to be scraped. When the scraper is used, the fingers independently flex so that their scraping edges are independently wedged in the ice to be scraped, and ice fracturing energy is stored in the fingers. The fingers exert force against the ice resulting from energy imparted to the handle by the user and from the stored energy, to fracture the ice, and then resiliently return to their original shape, thereby facilitating displacement of fractured ice away from the scraped surface. The separate flexible finger arrangement of the scraper, besides allowing the storage of energy in the fingers to enhance ice displacement, also gives greater effectiveness to the scraper in cleaning curved surfaces since the independently flexible fingers may conform more readily to such a surface than a solid blade.

It is an object of this invention to provide an improved and novel ice scraper. It is a principal object to provide a scraper with individual flexing fingers that nevertheless can provide a streak-free cleaning swath across an ice or frost covered surface. It is another object to provide a fingered scraper that is resistant to fracturing along the grooves separating the fingers. It is also an object to provide a scraper that has improved ice deflecting or directing characteristics. Other objects are to provide an inexpensive, easily fabricated, effective ice scraper.

SUMMARY OF THE INVENTION

The scraper has a one piece body with a handle section, intermediate section and blade region. The blade region has a plurality of resilient, independently flexible, scraping fingers, each finger extending from the intermediate section and terminating in a front scraping edge. The fingers are joined by web members extending between adjacent fingers, the web members having front edges aligned with the finger scraping edges so that a continuous scraper blade edge is formed that can clean a surface without leaving streaks. Preferably, the web members are about a few thousandths of an inch thick. Another feature of the invention is that the web members are breakable in response to use of the scraper without losing their effectiveness.

The scraping fingers have lateral edges, in one aspect of the invention, that converge inwardly back from the scraper edge and converge inwardly in an upward direction to facilitate flexure of the fingers while the front scraping edges remain adjacent. Preferably, the intermediate section has concave curved front edges extending from the rear of each finger lateral edge to the rear of the oppositely facing lateral edge. In another aspect of the invention the fingers each have a forward facing ice deflecting surface extending upwardly from the scraping edge at an obtuse angle in relation to the portion of the surface to be scraped and a forward facing ice chipping surface extending vertically upwardly from an intersection with the ice deflecting surface that is spaced from the scraping edge.

BRIEF DESCRIPTION OF THE DRAWING

These and other objects and features of the invention will be apparent to those skilled in the art from the following description of a preferred embodiment and from the drawing, in which:

FIG. 1 is a plan view of an ice scraper embodying the invention;

FIG. 2 is a side elevational view of the scraper of FIG. 1;

DESCRIPTION OF A PREFERRED EMBODIMENT

Figure 3:
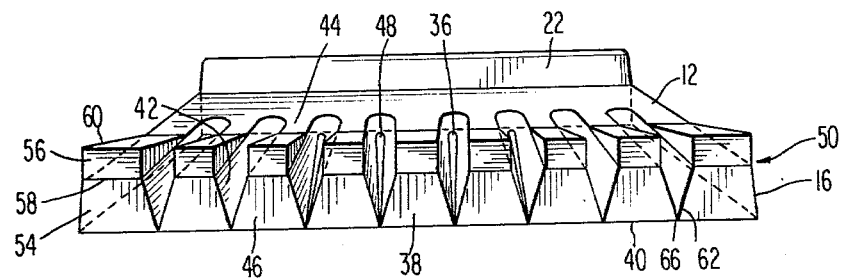
FIG. 3 is a front elevational view of the scraper of FIG. 1.

FIGS. 1 and 2 show a scraper having a body 10 molded in one piece from a copolyester such as that sold by the Plastics Division of Eastman Chemical Products, Inc. under the designation KODAR PETG copolyester 6763. The body 10 has a pair of substantially congruent top and bottom surfaces 12, 14, and defines a blade region 16, a handle section 18, and an intermediate section 20 extending therebetween. An elongate handle 22 made from a rigid plastic envelops the handle section 18 and a portion of the intermediate section 20 of the scraper body 10. The handle 22 includes an opening 24 through which a decorated portion of the body handle section 18 may be seen, and a hole 26 by which the scraper may be hung.

In the illustrated embodiment, the scraper is widest at the blade region 16 and arcuately tapers inwardly and backwardly toward the handle section 18, the intermediate section 20 narrowing at a shoulder region 28 to form a handle section 18 sufficiently narrow to fit the handle 22. The intermediate section 20 is preferably curved to define a concave portion 30 of the bottom surface 14. This enables the user to grip the handle 22 and to apply scraping force longitudinally (in the direction of the arrow 32 shown in FIG. 4) of the surface 34 to be scraped, e.g., a windshield, yet the fingers of the hand of the user do not contact the surface.

Figure 5:
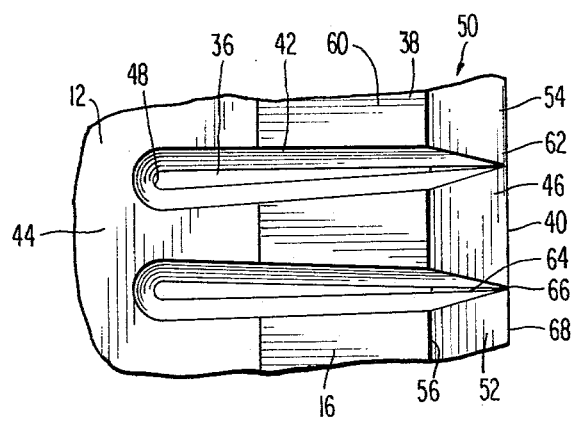
FIG. 5 is a plan view of a portion of the blade region of the scraper.

Referring to FIGS. 3 and 5 particularly, it can be seen that the blade region 16 is intersected by a plurality of slots 36 that extend back through the body 10 of the scraper to define a plurality of downwardly curved, independently flexible, resilient scraping fingers 38, each finger 38 extending from the intermediate section 20 and terminating in a front scraping edge 40. The sides of the slots 36 are formed by the lateral edges 42 of the scraping fingers 38.

The scraping finger lateral edges 42 converge inwardly back from the scraping edge 40, and converge inwardly in the upward direction. The rear portion 44 of each scraping finger 38, where the finger joins the intermediate section 20, is therefore smaller in cross section than the front portion 46, enhancing the flexure capacity of the fingers 38. The finger rear portions 44 are somewhat spaced apart; the finger front scraping edges 40 of companion fingers 38 are adjacent one another.

The intermediate section 20 has a plurality of concave curved front edges 48 extending from the lateral edge 42 at the rear portion 44 of each finger 38 to the opposite lateral edge 42 of an adjacent finger 38. The curved nature of the edge 48 is preferred to sharp corners at the end of the slots 36 to prevent stress concentration that could fracture the fingers 38 when the scraper is in use.

Figure 4:
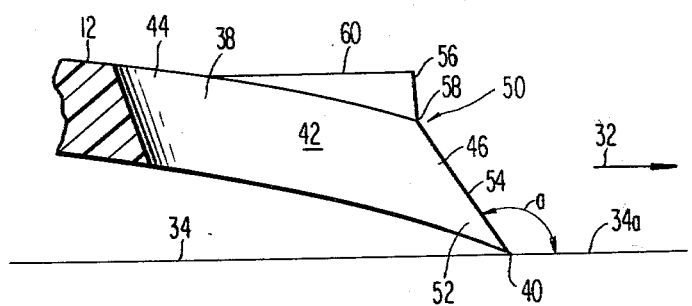
FIG. 4 is a detailed side view, partially in section, of a finger of the scraper.

As shown in FIG. 4, each flexible scraping finger 38 includes a front surface 50 having a bottom flexible chisel portion 52 terminating in the front scraping edge 40 and operable to engage the ice-covered surface 34 with a forward facing ice deflecting surface 54 inclined at an obtuse angle "a" in relation to a portion 34a of the surface to be scraped. The front surface 50 of each finger 38 also includes an upper knuckle-like portion that has a forward facing ice chipping surface 56 extending vertically upwardly from an intersection 58 with the ice deflecting surface 54 that is spaced from the scraping edge 40. Ice deflected along the first deflecting surface 54 when the scraper is moved in the direction shown by the arrow 32 will be chipped and further deflected along the ice chipping surface 56 and directed upwardly, away from the hand of the user. A generally horizontal surface 60 extends back from the top of the ice chipping surface 56 to an intersection with the scraper body top surface 12 defining the top of the fingers 38.

While the rear portions 44 of the fingers 38 are spaced apart as a result of the finger lateral edges 42 converging, the ends 62 of front scraping edges 40 of companion fingers 38 are adjacent one another. The scraping edges 40 are aligned, and the fingers 38 are joined by a plurality of thin webs 64, each web 64 extending between adjacent fingers 38 and having a front edge 66 aligned with the finger scraping edges 40 so that a continuous scraper blade edge 68 is formed that can clean a surface 34 in a swath as wide as the blade edge 68 without leaving streaks from gaps between the fingers 38. The webs 64 are only a few thousandths of an inch thick, and are formed as part of the molding process for the scraper body 10. The webs 64 are like "flash" between the larger finger 38 elements of the molded body 10. The webs 64 therefore are thin enough not to interfere with the individual flexibility of the scraper fingers 38, allowing the fingers 38 to separately store energy and to readily conform to the shape of the surface 34 to be scraped.

While the webs 64 may remain intact, it is anticipated that when the scraper is used, particularly on uneven surfaces, the thin webs 64 may fracture. This, however, will not reduce their effectiveness. The fingers 38 will maintain their relative orientation, with their front scraping edges 40 aligned. The fractures that will occur in the webs 64 will be thin, hair-line fractures that will have little effect on the swath cleared by the blade edge 68 formed from the combination of finger front scraping edges 40 and web front edges 66. Under the circumstances of fractured webs 64, the blade edge 68 is more properly referred to as a continual blade edge, rather than a continuous blade edge, since the fractures would create actual interruptions, minute though they may be, in the blade edge 68.

In operation of the scraper, when scraping force is applied to the scraper body 10 in the forward direction as shown by the arrow 34, the blade edge 68 becomes nested between the ice and the surface 34, i.e., becomes wedged in the ice. As resistance is encountered, the fingers 38 independently flex or bow until the ice fractures. The flexing of the fingers 38 are enhanced by the convergence of the finger lateral edges 42 to create a smaller (and hence more flexible) cross section of the fingers 38 near the intermediate section 20. The front scraping edges 40 remain, however, adjacent each other, so that the thin webs 64 easily extend from one to the other. The plurality of webs 64 joining the finger front scraping edges 40 to form a continuous blade edge 68 allows a streak free swath to be made in the ice or frost covering the surface 34 to be cleaned. The webs 64 are breakable, but it is anticipated that the change of condition of the blade edge 68 from continuous (having no interruptions) to continual (having relatively minor interruptions from hairline cracks in fractured webs 64) will have a minimum effect on its operation.

The ice chipping surfaces 56 of the fingers 38 change the direction of ice slipping up the ice deflecting surface 54, helping induce further fracturing of the ice, and also directing broken ice upwardly rather than back toward the user's hand.

The curvature of the edges 48 at the front of the intermediate section 20, joining the lateral edges 42 of the fingers 38 at their rear, gives a rounded end to the slots 36 separating the fingers 38, eliminating the stress concentration that would occur for slots with sharp corners.

While the present invention has been described with reference to a preferred embodiment, those familiar with this disclosure and skilled in the art may recognize additions, deletions, substitutions and other modifications and equivalents which would fall within the purview of the invention as set forth in the appended claims.

The embodiments of the invention in which an exclusive property or privilege is claimed are defined as follows:

1. A hand-held scraper for removing ice from a smooth surface, said scraper comprising a one piece body defining:
   a handle section extending from said handle section, and a blade region comprising:
   a plurality of resilient, independently flexible, scraping fingers, each said finger extending from said intermediate section and terminating in a front scraping edge, and
   a plurality of thin web members, each said web member being thin enough not to interfere with the individual flexibility of said scraping fingers, and extending from a finger to an adjacent finger, and having a thin front edge aligned with said scraping edges of said web members, and the scraping edges of said fingers thereby forming a continuous scraper blade edge.

2. The scraper of claim 1 wherein each said scraping finger has lateral edges that converge inwardly back from said scraping edge.

3. The scraper of claim 1 wherein each said scraping finger includes:
- a forward facing ice deflecting surface extending upwardly from said front scraping edge at an obtuse angle in relation to the portion of the surface to be scraped, and
- a forward facing ice chipping surface extending vertically upwardly from said ice deflecting surface at an intersection with said surface that is spaced from said front scraping edge.

4. The scraper of claim 1 wherein said web members are breakable in response to use of the scraper.

5. The scraper of claim 1 wherein said web members are approximately a few thousandths of an inch thick.

6. The scraper of claim 1 wherein each said scraping finger has lateral edges that converge inwardly upwardly, and companion ones of said scraping finger scraping edges are adjacent.

7. A hand-held scraper for removing ice from a smooth surface, said scraper comprising a molded one piece body defining:
- a handle section,
- an intermediate section extending from said handle section, and
- a blade region comprising:
- a plurality of resilient, independently flexible, scraping fingers,
- each said finger extending from said intermediate section and terminating in a front scraping edge aligned with the front scraping edges of the other fingers,
- each said finger having lateral edges that converge inwardly upwardly, and that converge inwardly back from said scraper edge to facilitate flexure of said fingers, and
- a plurality of breakable web members, approximately a few thousandths of an inch thick,
- each said web member extending from a finger to an adjacent finger and having a front edge aligned with said finger scraping edges, thereby forming a continual scraper blade edge.

8. A hand-held scraper for removing ice from a smooth surface, said scraper comprising a one piece body defining:
- a handle section,
- an intermediate section extending from said handle section, and a blade region comprising:
- a plurality of resilient, independently flexible, scraping fingers, each said finger extending from said intermediate section and terminating in a front scraping edge, each said finger having lateral edges that converge inwardly back from said scraping edge, and
- a plurality of web members, each said web member extending from a finger to an adjacent finger and having a front edge aligned with said scraping edges of said adjacent fingers, the front edges of said web members and the scraping edges of said fingers thereby forming a continuous scraper blade edge.

9. The scraper of claim 8 wherein said intermediate section defines a plurality of concave curved front edges, each said curved edge extending from the rear of a finger lateral edge to the rear of the opposite facing finger lateral edge.

10. A hand-held scraper for removing ice from a smooth surface, said scraper comprising a one piece body defining:
- a handle section,
- an intermediate section extending from said handle section, and a blade region comprising:
- a plurality of resilient, independently flexible, scraping fingers, each said finger extending from said intermediate section and terminating in a front scraping edge, each said scraping finger having lateral edges that converge inwardly upwardly, companion ones of said scraping finger scraping edges being adjacent, and
- a plurality of web members, each said web member extending from a finger to an adjacent finger and having a front edge aligned with said scraping edges of said adjacent fingers, the front edges of said web members and the scraping edges of said fingers thereby forming a continuous scraper blade edge.

* * * * *